(12) United States Patent
Caiozza

(10) Patent No.: US 8,196,684 B2
(45) Date of Patent: Jun. 12, 2012

(54) WEARABLE FOLDING WING APPARATUS

(76) Inventor: Joseph C. Caiozza, Maspeth, NY (US)

(*) Notice: Subject to any disclaimer, the term of this patent is extended or adjusted under 35 U.S.C. 154(b) by 29 days.

(21) Appl. No.: 12/925,314

(22) Filed: Oct. 20, 2010

(65) Prior Publication Data
US 2012/0098245 A1 Apr. 26, 2012

(51) Int. Cl.
A63C 11/00 (2006.01)
(52) U.S. Cl. .............. 180/2.2; 244/64; 280/810
(58) Field of Classification Search .......... 280/810, 280/816, 819; 180/2.2; 244/155 R, 22, 64; D12/322, 327
See application file for complete search history.

(56) References Cited

U.S. PATENT DOCUMENTS

| 4,738,460 | A | * | 4/1988 | Alexander | 280/213 |
| 4,756,555 | A | * | 7/1988 | Bachmann | 280/810 |
| 5,071,089 | A | * | 12/1991 | Fagan | 244/16 |
| 5,712,603 | A | * | 1/1998 | Kim et al. | 333/101 |
| 6,065,416 | A | * | 5/2000 | Araeen | 114/102.11 |
| 6,099,041 | A | * | 8/2000 | Carter | 280/810 |
| 7,097,134 | B1 | * | 8/2006 | Blum | 244/4 A |
| 8,087,609 | B2 | * | 1/2012 | Moore | 244/64 |
| 8,087,969 | B2 | * | 1/2012 | Sun et al. | 446/28 |

* cited by examiner

*Primary Examiner* — John Walters
*Assistant Examiner* — James Triggs

(57) ABSTRACT

A wearable folding wing apparatus includes a top central support ring having a pair of connected shoulder straps and a pair of selectively horizontally and vertically orientable wing support beams connected to the top central support ring with slidable connections. A pair of collapsible and extendable wing members are connected to the selectively horizontally and vertically orientable wing support beams. A user may employ provided arm connectors to lift and lower the selectively horizontally and vertically orientable wing support beams in order to deploy and collapse the wing members.

6 Claims, 3 Drawing Sheets

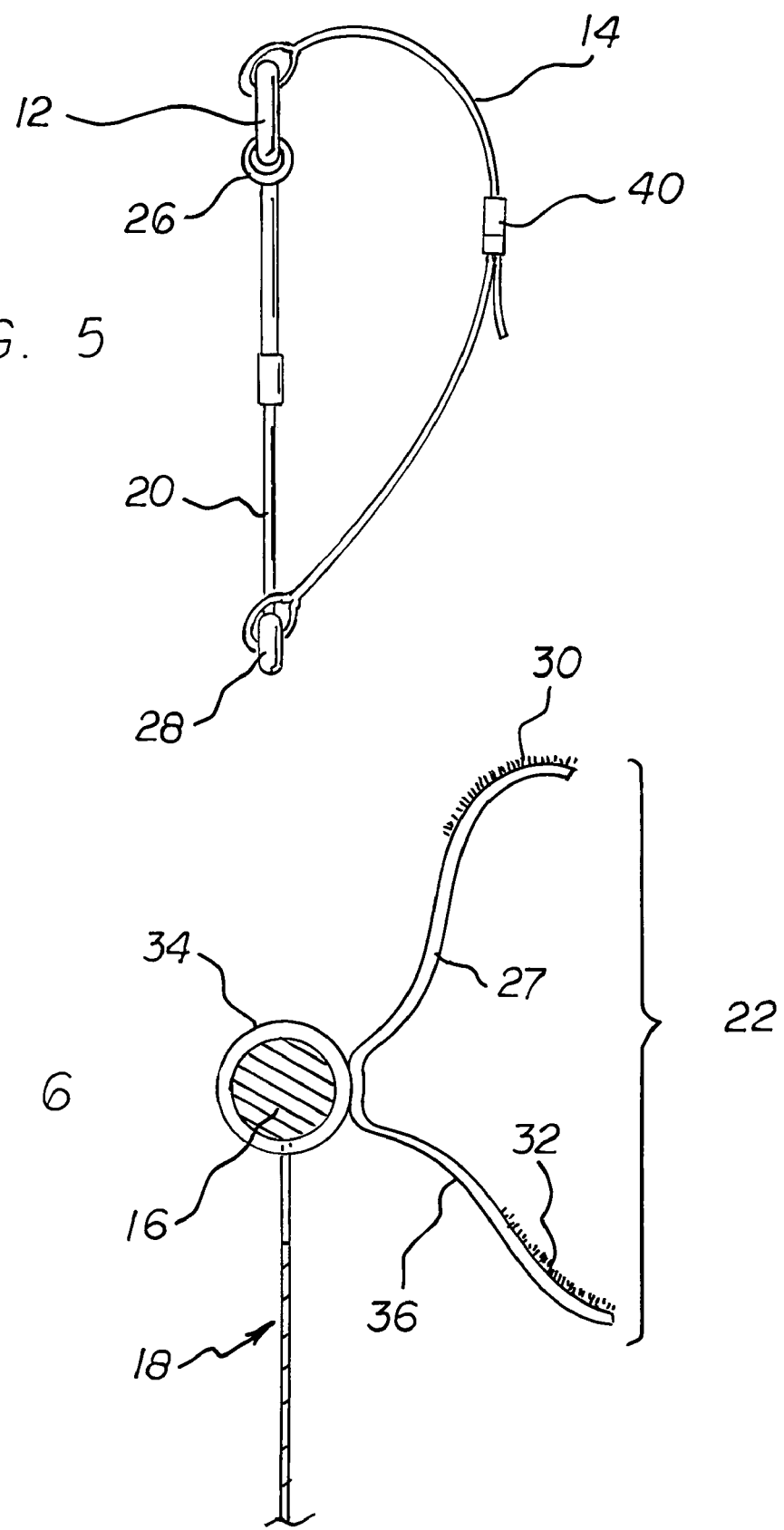

WEARABLE FOLDING WING APPARATUS

BACKGROUND OF THE INVENTION

1. Field of the Invention

The present invention relates generally to wearable sporting devices, and, more particularly, to wings or sails especially adapted for being worn by a person.

2. Description of the Prior Art

Wings or sails especially adapted for being worn by a person are well known in the art. In this respect, throughout the years, a number of innovations have been developed relating to wings or sails especially adapted for being worn by a person, and the following U.S. patents are representative of some of those innovations: 2,018,062, 5,713,603, 6,234,530, and 7,097,134. More specifically, each of U.S. Pat. Nos. 2,018,062, 5,713,603, 6,234,530, and 7,097,134 discloses a wing or sail device that is operated by a user's hands. As a result, when a user controls the respective device, both the user's hands are not free for carrying objects or extremely critical control activities, such as holding the handlebars of a scooter. To overcome this unfortunate lack of hands-free operation, it would be desirable if a wearable wing or sail device were constructed to provide hands-free operation.

SUMMARY OF THE INVENTION

To achieve the foregoing and other advantages, the present invention, briefly described, provides a wearable folding wing apparatus which includes a top central support ring. A pair of shoulder straps are connected to the top central support ring. A pair of selectively horizontally and vertically orientable wing support beams are connected to the top central support ring. The wing support beams are connected to the top central support ring with slidable connections. A pair of collapsible and extendable wing members are connected to the selectively horizontally and vertically orientable wing support beams. A central wing support beam is interconnected between the top central support ring and the pair of collapsible and extendable wing members, and a pair of arm connectors are connected to the pair of selectively horizontally and vertically orientable wing support beams. With the user employing the arm connectors to lift and lower the selectively horizontally and vertically orientable wing support beams and to deploy and collapse the wing members, the user clearly controls the wearable folding wing apparatus in a hands-free manner.

Preferably, the shoulder straps includes strap length adjusters which allow the lengths of the shoulder straps to be adjusted for an individual person.

Preferably, the slidable connections of the selectively horizontally and vertically orientable wing support beams include ring ends which are connected to the top central support ring. The central wing support beam includes a top connecting ring portion and a bottom connecting ring portion. wing folding beams interconnected between the wing members and the top central support ring.

Preferably, each of the arm connectors includes a support beam arm connector portion is connected to a selectively horizontally and vertically orientable wing support beam. A first arm connector strap portion is connected to the support beam arm connector portion. A second arm connector strap portion is connected to the support beam arm connector portion, and strap locking means are provided for locking the first arm connector strap portion to the second arm connector strap portion.

Preferably, the strap locking means include a first hook-or-loop connector attached to the first arm connector strap portion, and a complimentary second loop-or-hook connector is attached to the second arm connector strap portion for connecting the first arm connector strap portion to the second arm connector strap portion.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved wearable folding wing apparatus which has all of the advantages of the prior art and none of the disadvantages.

It is another object of the present invention to provide a new and improved wearable folding wing apparatus which may be easily and efficiently manufactured and marketed.

It is a further object of the present invention to provide a new and improved wearable folding wing apparatus which is of durable and reliable construction.

An even further object of the present invention is to provide a new and improved wearable folding wing apparatus which is susceptible of a low cost of manufacture with regard to both materials and labor, and which accordingly is then susceptible of low prices of sale to the consuming public, thereby making such wearable folding wing apparatus available to the buying public.

Still yet a further object of the present invention is to provide a new and improved wearable folding wing apparatus which provides hands-free operation.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 5 is an enlarged cross-sectional view of embodiment of the invention shown in FIG. 4, taken along line 5-5 thereof.

FIG. 6 is an enlarged cross-sectional view of the arm connectors in FIG. 4, taken along line 6-6 thereof.

DESCRIPTION OF THE PREFERRED EMBODIMENT

Figure 1:
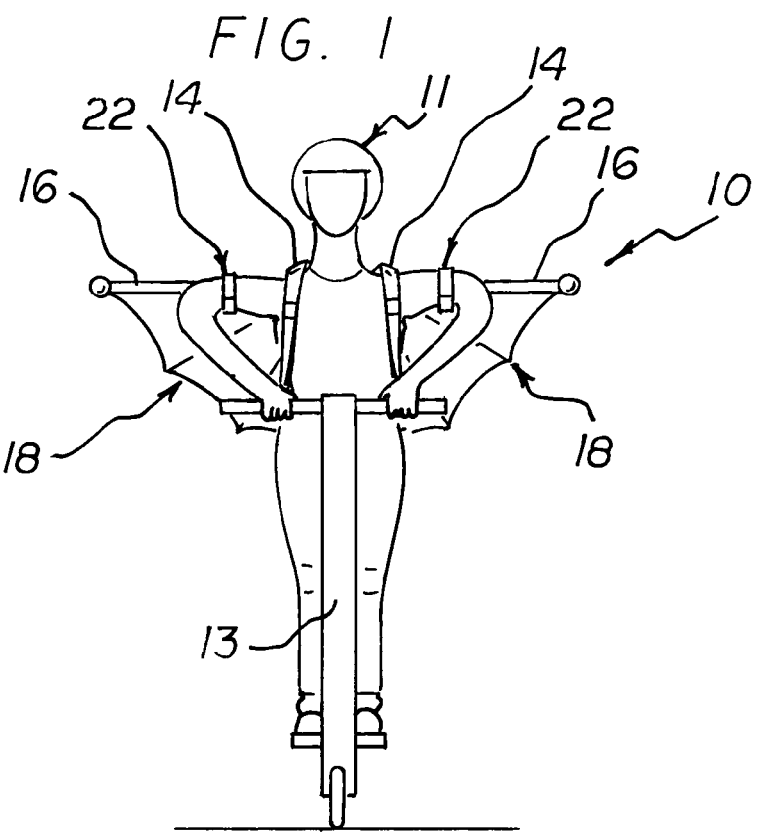
FIG. 1 is a front view showing a preferred embodiment of the wearable folding wing apparatus of the invention, in an extended orientation, worn by user standing on a wheeled scooter and grasping the handlebars of the scooter.

With reference to the drawings, a new and improved wearable folding wing apparatus embodying the principles and concepts of the present invention will be described.

Turning to FIGS. 1-6, there is shown a preferred embodiment of the wearable folding wing apparatus of the invention generally designated by reference numeral 10. In each of the figures, reference numerals are shown that correspond to like reference numerals that designate like elements shown in other figures.

In the preferred embodiment, wearable folding wing apparatus 10 includes a wearable folding wing apparatus 10 which includes a top central support ring 12. A pair of shoulder straps 14 are connected to the top central support ring 12. A pair of selectively horizontally and vertically orientable wing support beams 16 are connected to the top central support ring 12. The wing support beams 16 are connected to the top central support ring 12 with slidable connections. A pair of collapsible and extendable flexible wing members 18 are connected to the selectively horizontally and vertically orientable wing support beams 16. A central wing support beam 20 is interconnected between the top central support ring 12 and the pair of collapsible and extendable wing members 18, and a pair of arm connectors 22 are connected to the pair of selectively horizontally and vertically orientable wing support beams 16.

Preferably, the shoulder straps 14 includes strap length adjusters 40 which allow the lengths of the shoulder straps 14 to be adjusted for an individual person 11.

Preferably, the slidable connections of the selectively horizontally and vertically orientable wing support beams 16 include ring ends 38 which are connected to the top central support ring 12. The central wing support beam 20 includes a top connecting ring portion 26 and a bottom connecting ring portion 28. wing folding beams 24 interconnected between the wing members 18 and the top central support ring 12.

Preferably, the wing folding beams 24 have their own ring ends for connecting to the top central support ring 12.

Preferably, each of the arm connectors 22 includes a support beam arm connector portion 34 is connected to a selectively horizontally and vertically orientable wing support beam 16. A first arm connector strap portion 27 is connected to the support beam arm connector portion 34. A second arm connector strap portion 36 is connected to the support beam arm connector portion 34, and strap locking means are provided for locking the first arm connector strap portion 27 to the second arm connector strap portion 36.

Preferably, the strap locking means include a first hook-or-loop connector 30 attached to the first arm connector strap portion 27, and a complimentary second loop-or-hook connector 32 is attached to the second arm connector strap portion 36 for connecting the first arm connector strap portion 27 to the second arm connector strap portion 36.

With the person 11 wearing the wearable folding wing apparatus 10, the vertically oriented central wing support beam 20 substantially coincides with the spine of the person 11. To use the wearable folding wing apparatus 10 of the invention. A person 11 lifts the wearable folding wing apparatus 10 and threads his arms through the shoulder straps 14 so that the top portions of the shoulder straps 14 rest upon the shoulders of the person 11. Then, the person 11 connects the arm connectors 22 to his respective upper arm portions by wrapping the first arm connector strap portion 27 and the second arm connector strap portion 36 around each respective upper arm portion and connects the respective first hook-or-loop connector 30 to the second loop-or-hook connector 32. In this way, both the arm connectors 22 are attached to the respective upper arm portions of the person 11.

Figure 2:
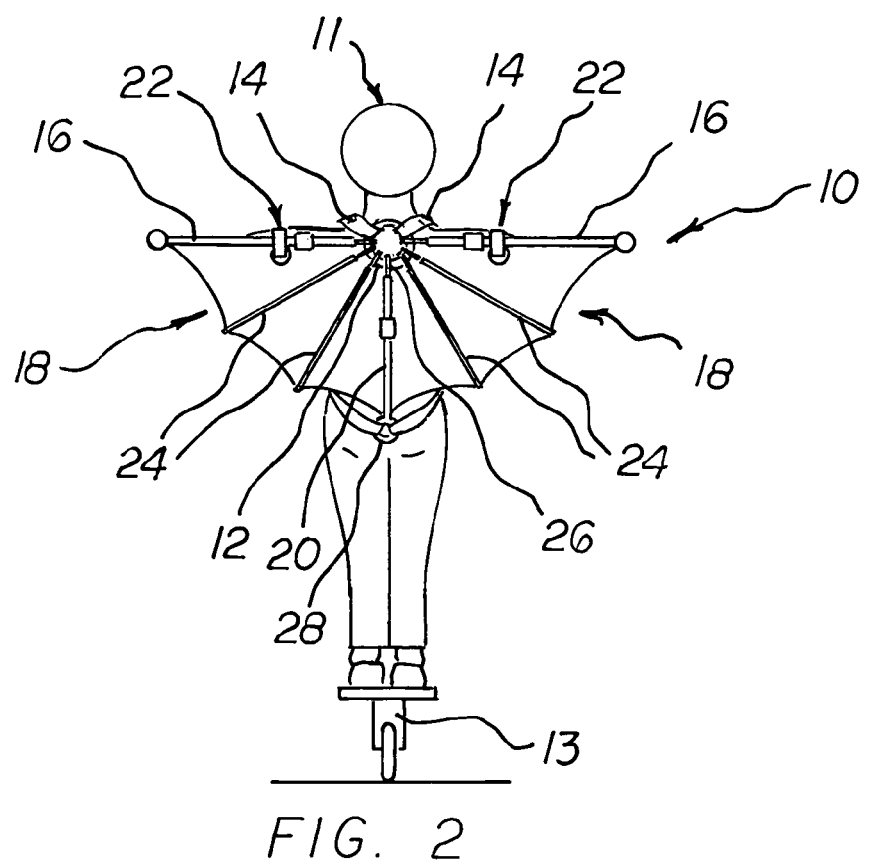
FIG. 2 is a rear view showing the embodiment of the invention in FIG. 1, in an extended orientation, worn by user standing on a wheeled scooter.

The person can be using one's hands in a normal manner, such steering the handlebars of the wheeled scooter 13. With the hands on the handlebars, the person 11 raises one's arms to the horizontal orientation as shown in FIGS. 1 and 2, and the pair of wing members 18 are fully deployed by the arm connectors 22 which lift the selectively horizontally and vertically orientable wing support beams 16. Clearly, the person 11 controls the deployment of the wing members 18 in a hands-free manner.

With the wing members 18 deployed, when the person 11 is riding on a sporting device, such as wheeled scooter 13, when the wind is blowing onto the face of the person 11, the wearable folding wing apparatus 10 serves as a braking device for slowing down the speed of the wheeled scooter 13 with the person 11 on it.

Conversely, when the wind is blowing onto the back of the person 11, the wearable folding wing apparatus 10 serves as a driving device for increasing the speed of the wheeled scooter 13 with the person 11 on it.

Figure 3:
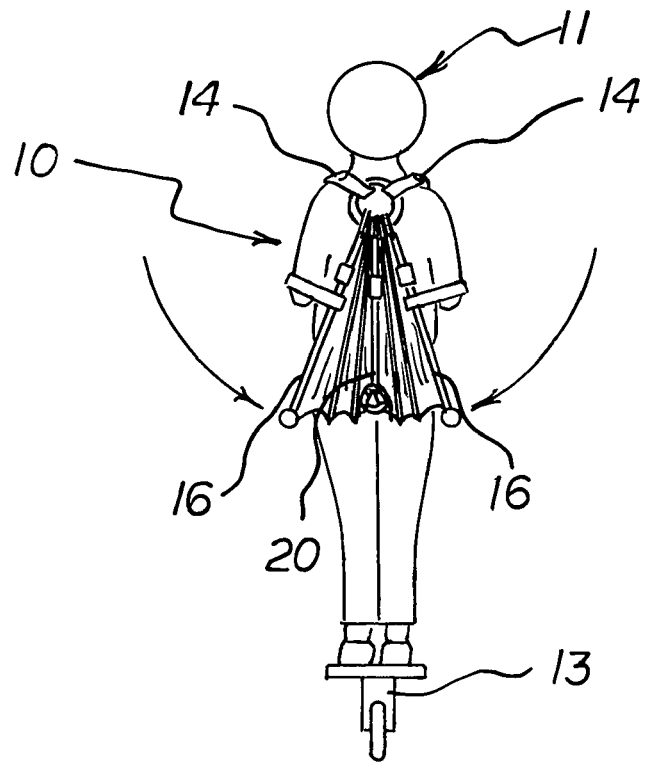
FIG. 3 is a rear view of the embodiment of the wearable folding wing apparatus shown in FIG. 2 with the embodiment in a folded orientation.
Figure 4:
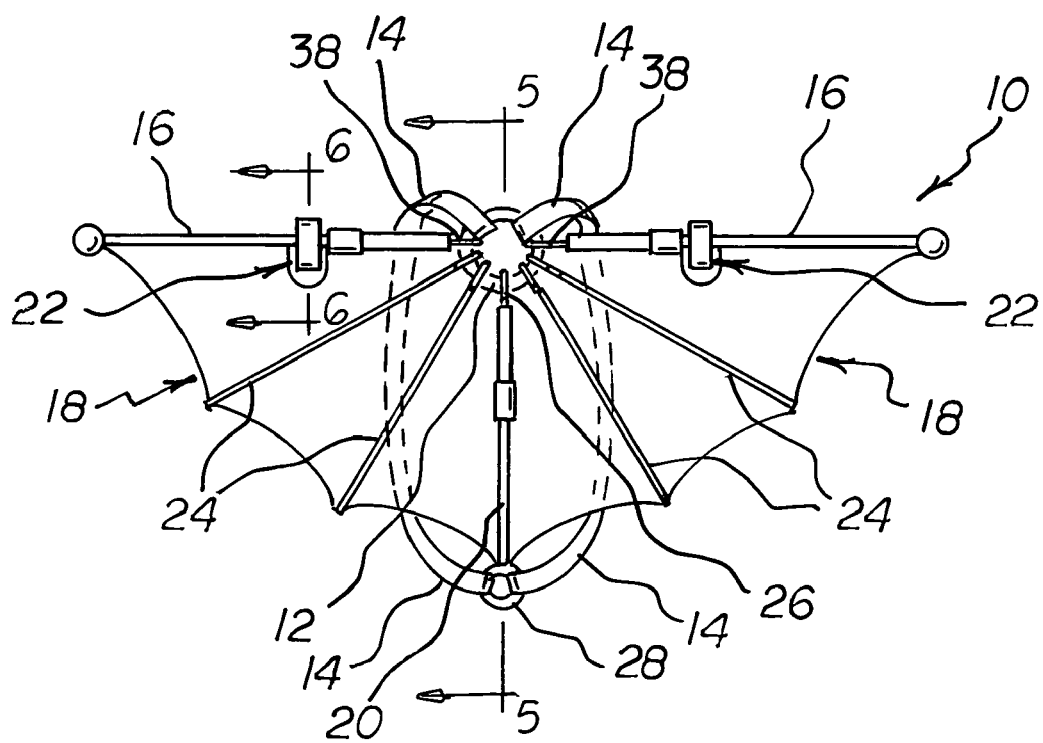
FIG. 4 is an enlarged rear view of the embodiment of the wearable folding wing apparatus of FIG. 2, removed from the user.

In contrast, when the person 11 wants to collapse the wing members 18, the person 11 simply lowers one's arms to a vertical orientation as shown in FIG. 3. When this is done, the arm connectors 22 lower the selectively horizontally and vertically orientable wing support beams 16 thereby causing the wing members 18 to collapse into the collapsed condition. In so being collapsed, the ring ends 38 of the selectively horizontally and vertically orientable wing support beams 16 slide along portions of the top central support ring 12. Clearly, the person 11 controls the collapse of the wing members 18 in a hands-free manner.

As shown in FIG. 3, portions of the wing members 18 fold around the wing folding beams 24 attached to the wing members 18. As the wing members 18 are collapsed, end ring portions of the wing folding beams 24 slide along the top central support ring 12.

The sporting device with which a wearable folding wing apparatus 10 of the invention can be used on devices such as roller skates, push scooters, skate boards, and skis, among others. The wearable folding wing apparatus 10 can also be worn by a person 11 using a water sporting device such as a surfboard. In addition, with a little practice, it may be possiblejor a person 11 to "tack" against the wind and move forward, just like sail boats do.

The components of the wearable folding wing apparatus of the invention can be made from inexpensive and durable metal and plastic materials. The wing members can include flexible waterproof material such as commonly used in umbrellas.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved wearable folding wing apparatus that is low in cost, relatively simple in design and operation, and which may advantageously be used to provide hands-free operation.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

What is claimed as being new and desired to be protected by Letters Patent of the United States is as follows:

1. A wearable folding wing apparatus, comprising:
   a top central support ring,
   a pair of shoulder straps connected to said top central support ring,
   a pair of selectively horizontally and vertically orientable wing support beams connected to said top central support ring, wherein said wing support beams are connected to said top central support ring with slidable connections,
   a pair of collapsible and extendable wing members connected to said selectively horizontally and vertically orientable wing support beams,
   a central wing support beam interconnected between said top central support ring and said pair of collapsible and extendable wing members, and
   a pair of arm connectors connected to said pair of selectively horizontally and vertically orientable wing support beams, and
   wherein said slidable connections of said selectively horizontally and vertically orientable wing support beams include ring ends connected to said top central support ring.

2. The apparatus of claim 1 wherein said shoulder straps include strap length adjusters which allow the lengths of the shoulder straps to be adjusted for an individual person.

3. A wearable folding wing apparatus, comprising:
   a top central support ring,
   a pair of shoulder straps connected to said top central support ring,
   a pair of selectively horizontally and vertically orientable wing support beams connected to said top central support ring wherein said wing support beams are connected to said top central support ring with slidable connections,
   a pair of collapsible and extendable wing members connected to said selectively horizontally and vertically orientable wing support beams,
   a central wing support beam interconnected between said top central support ring and said pair of collapsible and extendable wing members, and
   a pair of arm connectors connected to said pair of selectively horizontally and vertically orientable wing support beams, and
   wherein said central wing support beam includes a top connecting ring portion and a bottom connecting ring portion.

4. The apparatus of claim 1, further including:
   wing folding beams interconnected between said wing members and said top central support ring.

5. A wearable folding wing apparatus, comprising:
   a top central support ring,
   a pair of shoulder straps connected to said top central support ring,
   a pair of selectively horizontally and vertically orientable wing support beams connected to said top central support ring, wherein said wing support beams are connected to said top central support ring with slidable connections,
   a pair of collapsible and extendable wing members connected to said selectively horizontally and vertically orientable wing support beams,
   a central wing support beam interconnected between said top central support ring and said pair of collapsible and extendable wing members, and
   a pair of arm connectors connected to said pair of selectively horizontally and vertically orientable wing support beams, and
   wherein each of said arm connectors include:
   a support beam arm connector portion connected to a selectively horizontally and vertically orientable wing support beam,
   a first arm connector strap portion connected to said support beam arm connector portion,
   a second arm connector strap portion connected to said support. beam arm connector portion, and
   strap locking means locking said first arm connector strap portion to said second arm connector strap portion.

6. The apparatus of claim 5 wherein said strap locking means include:
   a first hook-or-loop connector attached to said first arm connector strap portion, and
   a complimentary second loop-or-hook connector attached to said second arm connector strap portion for connecting said first arm connector strap portion to said second arm connector strap portion.

* * * * *